July 9, 1935.   W. D. FOSTER ET AL   2,007,188
FILM HANDLING APPARATUS
Filed May 26, 1932
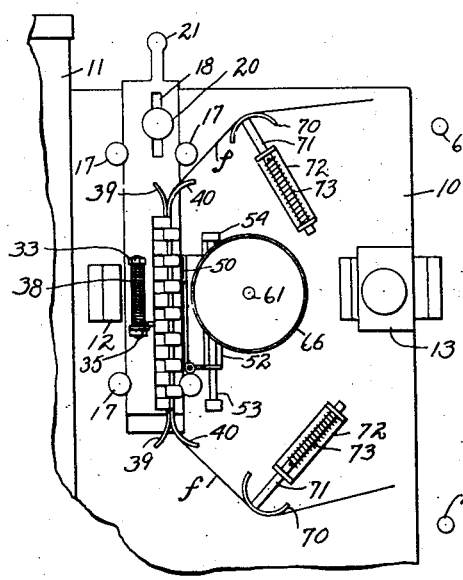
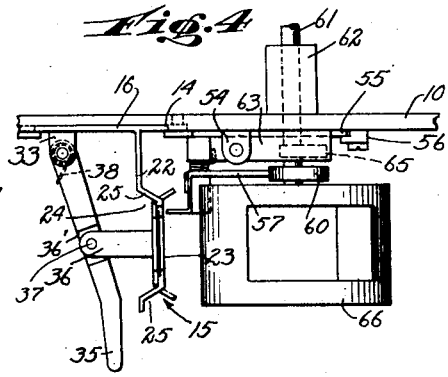
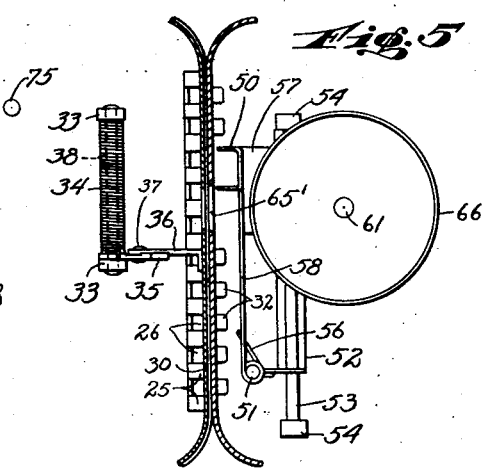
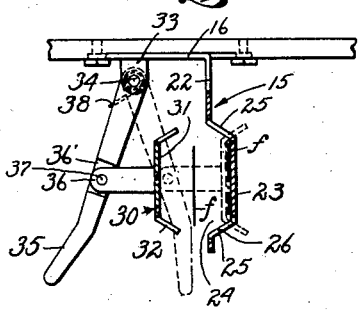
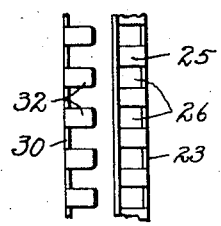
INVENTOR.
WARREN DUNHAM FOSTER.
FREDERICK DAVENPORT SWEET.
BY
ATTORNEY.

Patented July 9, 1935

2,007,188

UNITED STATES PATENT OFFICE 2,007,188

FILM HANDLING APPARATUS

Warren Dunham Foster, Washington Township, Bergen County, N. J., and Frederick Davenport Sweet, New York, N. Y., assignors, by direct and mesne assignments, to Kinatome Patents Corporation Application May 26, 1932, Serial No. 613,664

25 Claims. (Cl. 88—17)

The present invention relates generally to film handling apparatus and more particularly to gates for such apparatus. It applies to apparatus for the recordation or reproduction of sound as well as to apparatus for the taking or projecting of pictures.

As is well known in the art, while the film is being threaded through a usual gate of a motion picture projector, for example, the accurate positioning and holding of the film in the film track until the gate is closed often gives trouble, especially to amateurs, although the initial placing of the film in the general region of the film track is not difficult. One object of the present invention is to provide an improved gate for a film handling apparatus which automatically and accurately positions the film in the film track after the film is initially placed in the region of the track.

In the co-pending application of Barton Allen Proctor, Serial Number 348,633, filed March 20, 1929, now Patent No. 1,944,037, January 16, 1934 there is disclosed a film handling apparatus and means cooperating with the gate for sweeping the film from one side of the region of the gate into the film track. An object of the present invention is to provide means in a film handling apparatus for sweeping a film into the film track from a region at either side of the plane of the track. It is a further object of our invention to mount such film sweeping means on the gate section of the apparatus in a way to secure a unitary arrangement and easy assembly of the parts of the film sweeping means.

It is a further object of our invention to construct a portion of the above noted film-sweeping means integral with the movable gate section for nestable engagement with the portion on the fixed gate section whereby a film-sweeping means may be secured which adds but little to the cost or bulk of the apparatus. It is another object of our invention to provide an inexpensive gate for motion picture apparatus which includes an operable gate section and a pivotal mounting therefor which permits the top portion of the gate section to yield slightly when a patch or extra thick section of the film is entering the top of the gate between its two sections, and also permits the entire movable gate section to yield slightly to permit a thick section of the film to pass easily through the gate or to be swung a considerable distance away from the fixed section for film threading purposes.

Another object of our invention is to provide a gate having a fixed section and a movable section and inexpensive and compact means for mounting both gate sections on a film handling apparatus so that both the fixed gate section and movable gate section can be easily moved up or down together for framing the picture.

The novel gate structure described and claimed herein is suitable for use in various types of film handling apparatus and may be employed to special advantage in inexpensive motion picture apparatus for amateur users such as is described and claimed in the co-pending application of Warren Dunham Foster, Serial Number 613,661 filed concurrently herewith, now Patent No. 1,944,027, January 16, 1934.

While only one form of our invention is shown in the accompanying drawing, it will be understood that it may be embodied in other forms without departing from the spirit of the invention or of our broader claims appended hereto.

Figure 1 is a fragmentary side view of a motion picture projector having our improved gate applied thereto.

Figure 2 is an enlarged top view, broken away in part, of the structure shown in Figure 1.

Figure 3 is a fragmentary vertical side view of the structure of Figure 2.

Figure 4 is a detail plan view to an enlarged scale illustrating the construction of the film sweeping means of our invention.

Figure 5 is an enlarged side view broken away in part of the structure shown in Figure 1.

Our invention may be applied to a motion picture projector which may include an upright main mounting frame 10 on which may be supported a lamp housing 11 for a usual lamp (not shown). A condensing lens 12 and objective lens 13 may be mounted on the frame 10 for cooperation with the lamp in the lamp housing 11.

To accomplish that object of our invention which is to provide inexpensive compact means for mounting our improved gate on an upright mounting frame such as the frame 10 so that both gate sections can be easily shifted up or down together when framing a picture on the screen (not shown), a relatively wide shallow slot 14 may be provided in the frame 10 and a relatively fixed gate section, generally designated as 15, may be made with an integral base portion 16 wide enough to have a sliding fit in the slot 14. To hold the fixed section 15 on the side of the mounting frame 10, screws having large heads 17 may be threaded in the frame 10 so that the heads 17 may extend over the side edges of the flange portion 16. To adjust the flange portion up or down, a lengthwise slot 18 is provided in the flange and a binding shoulder screw 20 having a thumb nut head is threaded in the frame 10 so that the shank of the screw is disposed in the slot 18. By unloosening the screw 20 the flange portion may be raised or lowered the desired amount by a hand piece 21 integral therewith and then the screw 20 may be tightened again.

For reasons presently to appear, it is desirable to space the film track at some distance from the frame 10 and accordingly a web portion 22 is integrally joined to the flange portion 16 and extends forwardly therefrom at a right angle. A body portion 23 is integrally joined to the forward side edge of the web and has formed therein a channel 24, the longitudinal axis of which is parallel to the flange 16. The track for the film extends along the bottom of the channel, the central portion of the track being relieved in a usual way and the longitudinal axes of the track and the channel being positioned in the same plane. In threading a film through the open gate, especially when threading it side-wise, it is relatively easy to initially position the film in the channel 24 or adjacent thereto just a little out of alignment with a plane passing through the track at right angles thereto, i. e. to the bottom of the channel 24. For sake of brevity, this last mentioned plane is designated hereinafter and in the claims as the lateral plane of the film track or by an equivalent term. On each side of the channel 24 is formed a sloping side wall 25, each of which side walls is preferably made with a plurality of spaced parallel slots 26 for a purpose presently to appear.

For cooperation with the fixed gate 15, we provide a relatively movable gate section generally designated as 30 which includes a central relieved body portion 31 on each side of which are formed a plurality of spaced sloping fingers 32 so arranged that when the movable section is disposed in operative film feeding position by means presently to appear, each one of the fingers 32 is disposed in one of the slots 26 which are slightly wider than the fingers 32. It will be noted that the fingers on either side of the body 31 are sloped oppositely to the side wall 25 with which they coact.

For mounting the movable gate section two integral lugs 33 may be bent forwardly from the flange 16 and the vertical arbor 34 is rotatably mounted in these lugs. Fastened rigidly on this arbor is a forwardly extending handle or rock arm 35. The movable gate 30 may be mounted on this handle by means of a leftwardly extending integrally mounted lug 36 bent from the body portion 31. This lug is preferably fastened on the handle 35 by a pin 37 which engages in an oversized hole in the lug.

To prevent the movable gate section being swung about the pin 37 too far for the fingers 32 to engage in the slots 26, a narrow flat bottom valley or bend 36' may be made in the handle 35 and the lug 36 may be fastened by the pin 37 in this valley 36' so that any appreciable angular movement of the lug 36 relative to the handle 35 is prevented by the lug striking the sides of the valley. A spring 38 is disposed around the arbor 34 so as to urge the handle 35 rightwardly and to urge the gate section 31 against the fixed gate section 15.

By mounting the movable gate section 30 as described hereinbefore for movement about the pin 37 its uppermost portion 39 which is curved in the opposite direction from the curved uppermost portion 40 of the fixed gate section 15 can yield in a rockable manner about the pin 37 to the left when a patch or other thick portion of the film starts to pass between the straight portions of the gate section. Also it may be readily seen that the entire movable gate section can yield or be slightly moved by the film away from the fixed gate section around the arbor 34 as a pivot. Furthermore, this mounting of the movable gate section permits it to be easily swung to open film threading position as illustrated in Figure 2, in which position it may be latched by a detent not shown, or may be held open manually.

In certain types of apparatus making use of this gate and framing structure, the objective lens may be mounted for movement with the gate so that the optical axis of the aperture and that of the objective lens remain in fixed relation one to the other.

While the gate structure described above is suited for use with film handling apparatus in which the film is carried upon the conventional open reels or that in which the film is laterally threaded through the apparatus when carried in a film holder such as that described in the United States Patent No. 1,440,173 issued to Ponting and Ford and dated December 26, 1922, it may be applied to film handling apparatus in which a film is threaded endwise through the gate. Our gate functions for sweeping the film accurately into the film track as follows. Assuming that the longitudinal center line of the film has been initially placed somewhat to the front of the longitudinal center line of the film track as indicated by the solid line position of the film in Figure 2, it can be seen that as the gate section 30 is closed, i. e. moved rightwardly toward the fixed gate section as viewed in Figure 2, the outer ends of the forwardly disposed fingers 32 will pass in front of the film f in moving into their respective slots 26 in the side wall 25. Thus the fingers 32 move the film toward the fixed gate section 15 and at the same time engage with a camming action the forward side edge of the film and tend to move it inwardly. After the fingers enter the slots 26 the forward side edge of the film is then engaged by two cam elements—the fingers 26 and the side walls 25, which not only cooperate to sweep, i. e. move, the film in the same direction (inwardly), toward the plane of the film track, but they also cooperate to hold the film positively in engagement with both gate sections whereby it is necessarily cammed accurately into its track. A similar sweeping movement of the film in the opposite direction will take place should the film be initially placed to the inside of the vertical plane of the film track.

In case endwise threading is employed, the movable gate section is not moved far enough to the left, as viewed in the figures, prior to the threading operation to permit the film to escape from the channel formed between it and the fixed gate section while being propelled therebetween. The provision of a laterally enlarged track or tunnel for the film renders it more easily propelled between the gate section.

To permit the usual perforations in the film f to have inserted in them teeth of film feeding devices to be presently described, suitable slots may be provided in the fixed gate section 15 and the movable gate section 30 respectively, adjacent the inside edge of the film track. It will be noted that the sloping side walls 25 will function to seat the movable gate section 30 in the proper operative position each time relative to the fixed gate section 15 wherein the slots in the movable gate section and the slots in the fixed gate section are in register with each other.

For intermittently feeding a film through our improved gate a claw member 50 has teeth for engaging the film in the usual way, these teeth being constructed for entering the above mentioned registering slots in the gate sections. The claw member 50 is preferably mounted on a stub shaft 51 a considerable distance below the teeth so that they may move to and from the film in substantially a rectilinear direction. The stub shaft 51 may be mounted in the lower end of a carriage 52 which is mounted for slidable movement on an upright rod 53 which is fastened in lugs 54 supported on the mounting frame 10. In order that the frame 52 may move up and down in a vertical plane at right angles to the plane of the film track a rightwardly extending portion 55 of the frame 52 is arranged to move in a slot formed by mounting a guide member 56 on the frame 10 and having an undercut which receives the frame portion 55. A spring 56 around the stub shaft 51 normally urges the claw 50 away from the film. To move the claw toward the film a cam follower portion 57 is provided on a shank 58 which supports the claw 50. A cam 60 for cooperation with the cam follower 57 may be mounted on a shaft 61 of a motor not shown the shaft being journalled in a mounting boss 62 on the frame 10 and extending from the motor through the frame to the forward side thereof. Or, such a shaft may be driven in any desired manner. To move the claw member 50 up and down in the usual way for intermittently feeding the film, cam follower members 63 may be bent forwardly from top and bottom edges of a body portion of the carriage 52. A cam 65 may be mounted on the shaft 61 for cooperation with the cam follower portion 63 and may be so shaped and angularly positioned with respect to the cam 60 that it will begin moving the carriage and the claws 50 downwardly shortly after the teeth of the claw 50 are disposed in the perforations of the film f. Also this cam 65 will move the claw member 50 back to its upper position after it has been withdrawn from engagement with the film by springs 56. The intermittent movement described above is disclosed more specifically in the copending application of Barton Allen Proctor, Serial Number 332,296 filed January 14, 1929.

If desired, as taught in our co-pending application, Serial Number 613,600 filed May 26, 1932, the film moving members may be mounted integrally with the gate for removal therewith as a unit.

For cooperation with the film disposed in front of usual apertures 65' in the gate sections a barrel type shutter 66 may be mounted on the forward end of the shaft 61 and will function in a well-known way. In case the objective lens is mounted for movement with the gate during the framing operation, the conventional bladed shutter may be employed.

Instead of using conventional loops which frequently give trouble for feeding the film, it is preferred to feed the film under tension in a manner taught by the co-pending application of Bundick and Proctor, Serial Number 44,482 filed July 18, 1925, now Patent Number 1,944,022. To this end a film tensioning device may be mounted on the frame 10 between the upper curved end 40 of the fixed gate section and the spindle 67, upon which a delivery reel, not shown, may be mounted. This tensioning device may include a curved member 70 mounted on a plunger member 71 which is arranged for slidable movement in a U-shaped bracket 72. A spring 73 is disposed around the member 71 and engages against one arm of the bracket 72 and against a pin in member 71 normally to urge the curved member 70 against the film. A similar bracket device may be mounted on the frame 10 between the lower curved end 40 of the fixed gate section and the take up spindles 75. The construction and functioning of such film tensioning devices as described above is more fully set forth in our co-pending application Serial Number 567,108 filed October 5, 1931.

Certain of the advantages of our invention are evident from the foregoing part of this description.

Other advantages of our invention arise from the provision of a gate structure which may be manufactured as a separate unit and assembled with the remainder of the apparatus by an unskilled person either before or after the apparatus has left the factory.

Still other advantages arise from the provision of a gate in which the film may be laterally threaded, i. e. moved into the gate from one side and moved out of the gate from the opposite side.

Still other advantages arise from the provision of a gate section which is mounted for rockable movement in all directions with respect to the fixed gate section whereby the movable section may serve as a pressure pad.

We claim:

1. In a film handling apparatus, in combination, a fixed gate section having a channel and a film track disposed in said channel, a movable gate section, means for moving said movable gate section away from said fixed gate section so that a film may be threaded through said apparatus, film sweeping means on said fixed gate section, and film sweeping means on said movable gate section cooperating with said sweeping means on said fixed gate section to move a film initially placed in front of said channel adjacent the same into said track.

2. In a film handling apparatus, in combination, a fixed gate section having a track for a film, a movable gate section, means for mounting said movable gate section for cooperation with said film track, means for sweeping a film from a position at one side of said track into the same, said sweeping means including film engaging cam elements on said fixed gate section and cooperating film engaging cam elements on said movable gate section.

3. In a gate for a film handling apparatus, said gate having a film track, a movable gate section including a central portion associated with said film track, and a plurality of parallel film-sweeping fingers joined to each side of said film track portion of said movable section, said fingers being inclined materially at an obtuse angle to said film track portion to define therewith a channel.

4. As a new article of manufacture in film handling art, a movable gate section for a gate having a fixed gate section, a portion of which fixed section defines a track for the film, said movable gate section including a central portion for cooperation with said film track, and side wall portions extending toward said track and joined to each side of said central portion at a materially obtuse angle, said angularly disposed side wall portions being operative to engage one side edge of the film and sweep it laterally in one direction into said film track or to engage the other side edge of the film and sweep it laterally in the other direction into said film track.

5. In a film handling apparatus having a gate with a film track, in combination, a main mounting plate, a fixed gate section supported upon said plate and extending therefrom, a movable gate section disposed for cooperation with said fixed gate section, means for moving said movable gate section in open position relatively to said fixed gate section so that a film may be initially placed between the same and said fixed gate section, and co-operating film engaging means carried by each of said gate sections for moving a film which is positioned between said gate sections and an edge of which is disposed at a point between the edge of the film track adjacent said mounting plate and said mounting plate into the film track of said apparatus.

6. In a gate for a film handling apparatus, said gate having a film track and a fixed section and a movable section, film-sweeping means for moving the film from an initial position adacent the lateral plane of said film track into operative position in said film track, said means including co-operatingly placed film engaging devices forming integral elements of said gate sections.

7. In a film handling apparatus, in combination, a gate having a film track, said gate including a fixed gate section and a movable gate section, means for sweeping a film into said track from a region adjacent either side of said track upon the movement of said movable gate section toward said fixed gate section, said means including one or more members joined to each side of the film track portion of said movable gate section, the greater part of each of said members being disposed in one of two diverging planes, each plane having a forwardly inclined relation to the film track portion of said movable gate section, and means for moving said movable gate section toward said fixed gate section.

8. In a gate for a film handling apparatus, a fixed gate section including a film track portion and side wall portions joined to said track portion on each side thereof and forming therewith a film channel, said side wall portions each being inclined materially at an obtuse angle relatively to said track portion, whereby a film initially disposed in said channel approximately parallel to said track with an edge disposed against either of said side wall portions may be cammed sidewise into operative position in said track by the movement of said film toward said track, and means for moving said film towards said track.

9. In a gate for a film handling apparatus, a fixed gate section including a film track portion and side wall portions joined to said track portion on each side thereof and forming therewith a film channel, said side wall portions each being inclined materially at an obtuse angle to said track portion, said side walls each having a plurality of parallel elongated slots so disposed that a plane passing through the long axis of a slot perpendicular to the side wall portion associated with the slot is perpendicular to said track portion.

10. The structure described in claim 8, characterized by said sloping side walls having a plurality of parallel slots disposed in planes, each of which planes makes an approximate right angle to the axis of said track.

11. In a film handling apparatus, a fixed gate section having a portion defining a film track and a plurality of outwardly inclined, spaced finger elements joined to each side of said track, and a movable gate section having a central portion cooperating with said film-track-defining portion, and a plurality of outwardly inclined, spaced finger elements joined to each side of said central portion, said last named finger elements being disposed in staggered relation to said first named finger elements, said finger elements on said fixed gate section and said finger elements on movable gate section being oppositely inclined in a way to cooperate and provide an inward cam-mining action on the edge of a film disposed therebetween.

12. The structure described in claim 11, characterized by a pivotal mounting for said movable gate section and means necessarily maintaining the fingers on said movable gate section in position for cooperatively engaging the fingers on said fixed gate section as the gate is being closed.

13. In a film handling apparatus, a fixed gate section having a central film track defining portion, and portions joined to said central portion at each side thereof for forming a film-threading channel adjacent said track, a movable gate section having a central portion for cooperation with said central portion of said fixed gate section, said movable gate section having means forming with its central portion a film-threading channel, said means including a plurality of spaced fingers integrally joined to each side of said central portion of said movable gate section, the planes of said fingers being inclined at materially obtuse angles to said integral central portion, each of said channel-forming portions of said fixed gate section being inclined at materially obtuse angles to said central track defining portion and being constructed with a plurality of spaced slots for receiving the oppositely disposed fingers of said movable gate section, each of said channel-forming portions of said fixed gate section being oppositely inclined relatively to the fingers received in the slots thereof so as to cooperate with said last named fingers for moving a film in either direction into said film track upon movement of said movable gate section up against said fixed gate section.

14. In a film handling apparatus, a fixed gate section having a central film track defining portion, and portions joined to said central portion at each side thereof for forming a film-threading channel adjacent said track, a movable gate section having a central portion for cooperation with said central portion of said fixed gate section and further having means forming with its central portion a film-threading channel, said means including a plurality of spaced fingers integrally joined to each side of said central portion of said movable gate section, the planes of said fingers being inclined at materially obtuse angles to said integral central portion, each of said channel forming portions of said fixed gate section being inclined at materially obtuse angles to said central track defining portion and being constructed with a plurality of spaced slots for receiving the oppositely disposed fingers of said movable gate section, each of said channel forming portions of said fixed gate section being oppositely inclined relatively to the fingers received in the slots thereof so as to cooperate with said last named fingers for moving a film in either direction into said film track upon movement of said movable gate section up against said fixed gate section, and a mounting for said movable gate section which provides for rockable movement of said movable gate section in a direction lengthwise of said film track, said slots in said fixed gate section being arranged with an excess width to permit slight rockable movements of said fingers in said slots.

15. In a film handling apparatus, a fixed gate section including a channel portion having a film track, and side walls on each side of said track materially inclined inwardly toward said track, and means carried by said apparatus arranged to cooperate with said side walls for camming a film placed in approximate operative position in said channel into operative position in said track from either side thereof.

16. In a film handling apparatus having a film track, in combination, a gate having a fixed section and a movable section, each of said sections having cooperating film track portions, means for disposing said movable section in relatively distant relation to said fixed section so that a film may be initially placed between said gate sections in approximately operative position, and means mounted upon said movable gate section and so placed as to cooperate with said fixed gate section for moving the film into said track while said gate is being closed preparatory to the feeding of the film said means including one or more members joined to each side of the film track portion of said movable gate section, the greater part of each of said members being disposed in one or two diverging planes, each plane having a forwardly inclined relation to the film track portion of said movable gate section.

17. In a gate for a film handling apparatus, said gate having a fixed film track, a movable gate section including a central portion for cooperation with said film track, means for mounting said movable gate section for movement toward said film track substantially at right angles to the lateral plane of said film track, and a plurality of parallel film-sweeping fingers joined to each side of said central portion of said movable gate section, said fingers projecting from said central portion toward said fixed film track and the greater part of each of said fingers being inclined materially at an obtuse angle to said central portion to define therewith a channel, and means for moving said movable gate section toward said film track.

18. An openable gate for a film handling apparatus, said gate including a fixed section having a film track defining portion, a mounting base having a work face disposed at a substantial right angle to said film track, guiding means cooperating with said mounting base for guiding the same in a path parallel to said film track, a movable gate section, integral mounting lugs on said mounting base extending therefrom on the same side as said track portion relatively remote therefrom, a handle member pivotally mounted on said mounting lugs for movement toward and away from said gate, and means for mounting said movable gate section on said handle member.

19. In a film handling apparatus, in combination, a stationary upright mounting plate, an auxiliary mounting plate mounted on said stationary plate for adjustment up and down, a fixed gate section mounted on said auxiliary plate, a spring-urged handle member mounted on said auxiliary mounting plate for movement toward and away from said fixed gate section, and a movable gate section rockably mounted at a point intermediate its ends on said handle member for engagement with said fixed gate section, the rockable mounting of said movable gate section between its ends permitting yielding of the ends of said movable gate section upon the passage therealong of thickened sections of film.

20. In a film handling apparatus, in combination, a unitary gate device having an aperture, said gate device incuding an upright mounting plate, a fixed gate section rigidly mounted on said upright mounting plate, a gate section having a pivotal mounting support on said upright mounting plate, means supported by said mounting plate for urging said pivotally mounted gate section into engagement with said fixed section, means for mounting said pivoted gate section for rockable movement lengthwise thereof and transversely thereof, and means for moving said mounting plate up and down for adjusting said aperture lengthwise of the film for framing a picture projected from the film.

21. In a film handling apparatus, a fixed gate section, a section pivotally mounted for bodily movement toward said fixed gate section, means for mounting said pivoted gate section for rockable lengthwise movement, and devices for adjusting said means, said movable gate section and said fixed gate section along the path of the film as a unit.

22. In a film handling apparatus having a gate with a film track, in combination, a main mounting plate, a fixed gate section supported upon said mounting plate and extending therefrom across the optical axis of said apparatus, a movable gate section having a central portion disposed for cooperation with said fixed gate section, means for mounting said movable gate section upon said mounting plate, said last named means including devices for moving said movable section to open position relatively to said fixed gate section so that a film may be initially placed between said movable gate section and said fixed gate section, and means for moving a film laterally into said track from a position wherein an edge of the film is positioned between the edge of said track and said mounting plate, said moving means including a plurality of spaced fingers integrally joined to said central portion of said movable gate section on the side adjacent said plate, the planes of said fingers being inclined at materially obtuse angles to said movable gate section, said fixed gate section including a central track defining portion and portions joined to said central portion at each side thereof for forming a film-threading channel, the side portion of said fixed gate section opposite said fingers being formed with slots for receiving said fingers, said fingers and said inclined side portion of said fixed gate section cooperating for moving a film laterally away from said mounting plate into said film track.

23. In a film handling apparatus having a gate with a film track, in combination, a main mounting plate, a fixed gate section supported upon said mounting plate and extending therefrom across the optical axis of said apparatus, a movable gate section having a central portion disposed for cooperation with said fixed gate section, means for mounting said movable gate section upon said mounting plate, said last named means including devices for moving said movable section to open position relatively to said fixed gate section so that a film may be initially placed between said movable gate section and said fixed gate section, means for moving a film laterally into said track from a position wherein an edge of the film is positioned between the edge of said track and said mounting plate, said moving means including a plurality of spaced fingers integrally joined to each side of said central portion of said movable gate section, the planes of said fingers being inclined at materially obtuse angles to said movable gate section, said fixed gate section including a central track defining portion and portions joined to said central portion at each side thereof for forming a film-threading channel, the side portions of said fixed gate section opposite said fingers being formed with slots for receiving said fingers, said fingers and said inclined side portions of said fixed gate section cooperating for moving a film laterally away from said mounting plate into said film track, and a mounting for said movable gate section which provides for rockable movement of the same lengthwise of said film track.

24. In a film handling apparatus, a fixed upright mounting plate, a fixed gate section supported upon said mounting plate, said fixed gate section including a central track defining portion and portions integrally joined to said track defining portion at each side thereof at a materially obtuse angle, said side portions being provided with a plurality of spaced slots disposed in planes parallel to the optical axis of said apparatus, a film guiding member mounted upon said mounting plate adjacent each end of said fixed gate section, a movable gate section having film sweeping fingers arranged for engaging in said slots and inclined for cooperation with the gate portions around said slots for moving the film in either direction into said track after the film has been initially placed in said apparatus in engagement with said film guiding members and between said gate sections.

25. In a film handling apparatus, an upright mounting plate, an auxiliary mounting plate, means for mounting said auxiliary mounting plate on the side of said first named mounting plate adjacent the optical axis of said apparatus, a fixed gate section integrally joined to said auxiliary mounting plate, said fixed gate section having a track defining portion and a materially inclined portion integrally joined to said central track defining portion at each side thereof for forming a film threading channel adjacent said track, said inclined portions having a plurality of spaced slots, the planes of said slots being disposed parallel to the optical axis of said apparatus, a movable gate section having a central portion for cooperation with said track defining portion of said fixed gate section and materially inclined fingers on said movable gate section for engaging in said slots and cooperating with said inclined side portions of said fixed gate section for moving a film in either direction into said film track after said film has been initially placed in said channel, a mounting for said movable gate section for moving it away from said fixed gate section and toward the same so that the central portion of said movable gate section will be substantially parallel to the central track defining portion of said fixed gate section, said mounting including a handle member, and means for pivoting said handle on a vertical axis adjacent said auxiliary mounting plate, said mounting for said movable gate section further including means for pivotally supporting said movable gate section on said handle at a point distant from said pivot of said handle for lateral angular movement of said movable gate section, and means for limiting the angular movement of said movable gate section in either direction away from a position parallel to said track defining portion of said fixed gate section.

WARREN DUNHAM FOSTER.
FREDERICK DAVENPORT SWEET.